L. W. BUGBEE.
LENS GRINDING MACHINE.
APPLICATION FILED FEB. 12, 1919.
1,387,232.
Patented Aug. 9, 1921.
2 SHEETS—SHEET 1.
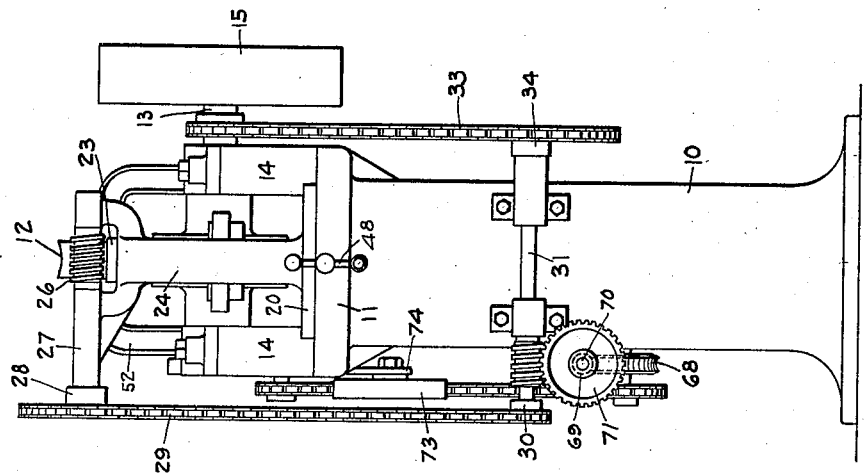
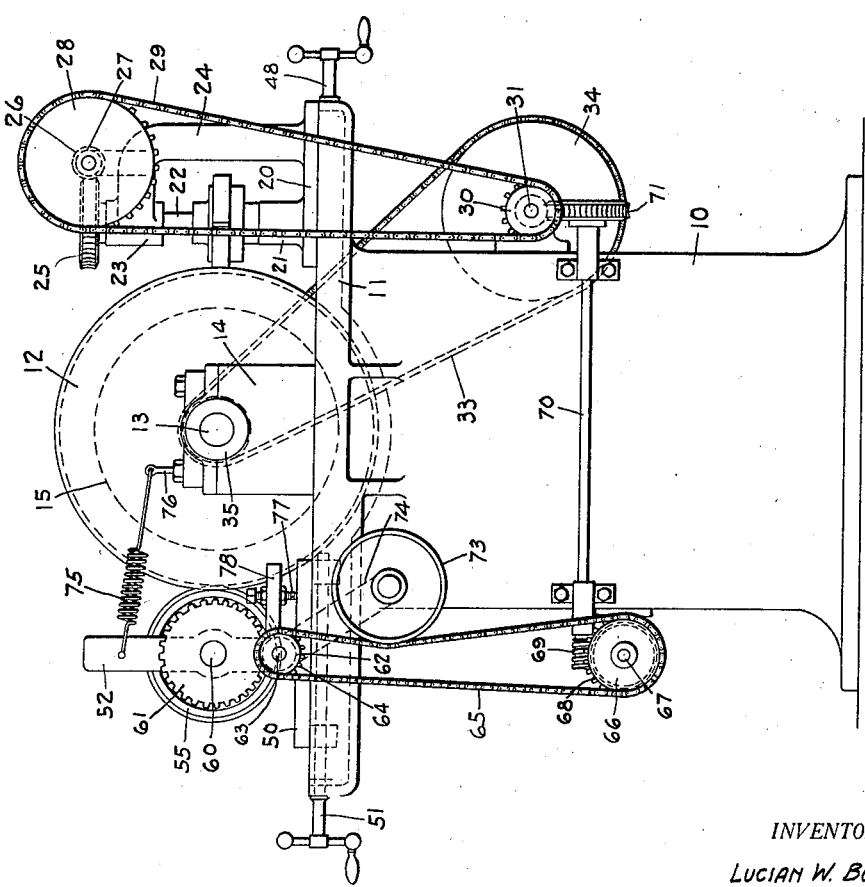
INVENTOR.
LUCIAN W. BUGBEE.
BY
Lockwood & Lockwood
ATTORNEYS L. W. BUGBEE.
LENS GRINDING MACHINE.
APPLICATION FILED FEB. 12, 1919.
1,387,232.
Patented Aug. 9, 1921.
2 SHEETS—SHEET 2.
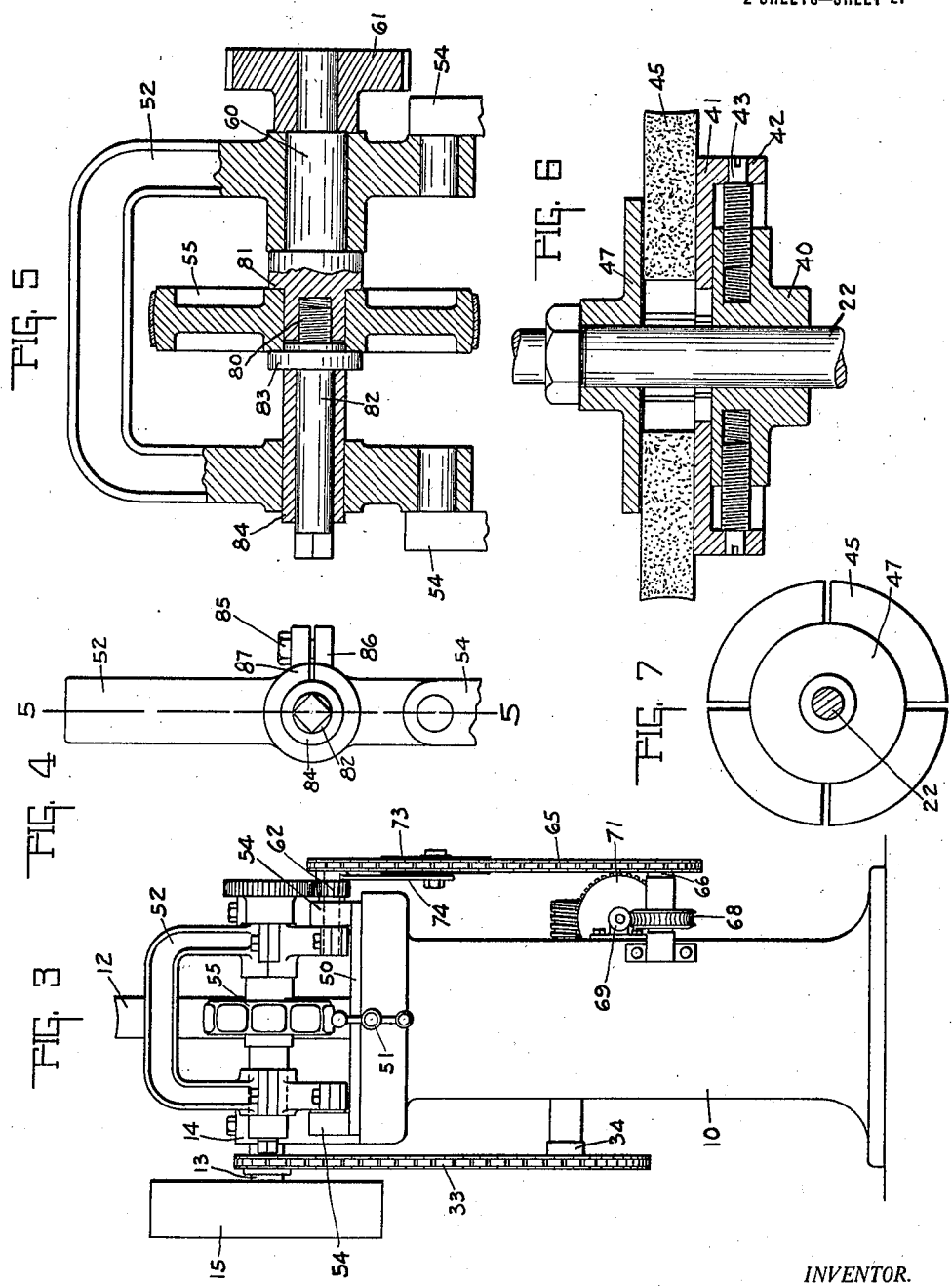
INVENTOR.
LUCIAN W. BUGBEE
BY
ATTORNEYS

UNITED STATES PATENT OFFICE.

LUCIAN W. BUGBEE, OF INDIANAPOLIS, INDIANA, ASSIGNOR TO ONEPIECE BIFOCAL LENS COMPANY, OF INDIANAPOLIS, INDIANA, A CORPORATION.

LENS-GRINDING MACHINE.

1,387,232.  Specification of Letters Patent.  Patented Aug. 9, 1921.

Application filed February 12, 1919. Serial No. 276,539.

*To all whom it may concern:*

Be it known that I, LUCIAN W. BUGBEE, a citizen of the United States, and a resident of Indianapolis, county of Marion, and State of Indiana, have invented a certain new and useful Lens-Grinding Machine; and I do hereby declare that the following is a full, clear, and exact description thereof, reference being had to the accompanying drawings, in which like numerals refer to like parts.

The object of this machine is to grind or surface toric, meniscus and other lenses accurately and rapidly. The invention was made with particular reference to its use in surfacing and grinding toric, meniscus and other lenses mounted on spotting wheels.

One feature of this invention consists in means substantially as illustrated and described for truing or maintaining in proper form an optical grinding or surfacing wheel, while it is performing its work of grinding or surfacing.

Another feature of the invention consists in the particular means shown and described for maintaining the lens blanks and holder in position for surfacing or grinding the blanks, and particularly the stop construction for limiting the movement of said lens blank holder toward the surfacing or grinding wheel.

The invention also includes the particular construction herein illustrated and described for accomplishing the particular work of which said construction is capable.

The full nature of the invention will be understood from the accompanying drawings and the following description and claims:

In the drawings, Figure 1 is a side elevation of the machine in operative condition. Fig. 2 is a rear elevation thereof. Fig. 3 is a front elevation thereof. Fig. 4 is a side elevation of the means for mounting the lens blank holder or spotting wheel. Fig. 5 is a section on the line 5—5 of Fig. 4, including, however, the spotting wheel, and a part being in elevation. Fig. 6 is a vertical central section through the truing wheel. Fig. 7 is a plan view thereof on a smaller scale.

There is shown in the drawings a machine which has an upright stand 10 having a table 11 upon which the mechanism is mounted. Midway of the length of said table, as shown in Fig. 1, there is mounted a grinding surfacing wheel 12 on a shaft 13 mounted in the bearing blocks 14 secured on the table and having a pulley 15 thereon which receives power from any suitable source, and, therefore, is the driver for this machine. By this means, the wheel 12 is revolved.

The surfacing or grinding wheel 12 may be made as desired and with any desired conformation of the periphery thereof to adapt it for grinding or surfacing lens blanks of the desired curvature or form. As herein shown, the periphery or grinding surface of said wheel 12 is concave in cross section to adapt it for grinding the plus surface of a toric lens blank. The wheel may be made of alundum, carborundum, emery or other abrasive, wherein the abrading material is united into a wheel by a rigid bond, like kaolin, sodium silicate, or other suitable rigid binding material. This bond binds the abrasive crystals rigidly in place, but in order to finish grinding the surface of the lens blank and prevent it being scratched by the protruding crystals which may work loose from said bond, the surfacing or grinding portion of said wheel is preferably treated with shellac, bakelite, condensite or other rough and elastic adhesive material dissolved by alcohol or other solvent, which enters the pores of the wheel between the crystals, so as to fill the same and form a tough elastic bond. This second or auxiliary bond is soft and elastic enough to allow the edges of the crystals to engage the glass and yet does not yield enough to allow the crystals to work loose. This gives a soft and velvety surface to the grinder, which, in turn, gives to the lens blank a superior velvety finish, even in the grinding operation, and a surface absolutely free from scratches and lines. It also causes the grinding wheel to be more durable and wear longer.

In order to maintain the proper curvature of the grinding surface of said wheel 12, a truing apparatus is associated therewith in this machine for operating said wheel, during the use of the wheel, for maintaining true curvatures thereon. This mechanism is shown at the right-hand side of Fig. 1, where there is a plate 20 adjustably mounted on the table 11 having a bearing 21 for the lower end of a shaft 22 that extends through a bearing 23 above on the upper end of an arm 24 secured to the plate 20. The shaft 22 has a worm wheel 25 secured on its upper end, driven by a worm 26 on a shaft 27 provided with a sprocket wheel 28 which is driven by a chain 29 running from a wheel 30 below on a transverse shaft 31 mounted to the stand 10, as seen in Fig. 2. This shaft is driven by a chain 33 which operates on a sprocket wheel 34 on said shaft 31, and another sprocket wheel 35 on the driving shaft 13, as seen in Figs. 1 and 2.

The foregoing driving mechanism is geared so as to rotate the shaft 22 slowly. Upon said shaft 22 the truing wheel is mounted, as shown in Fig. 6. The disk 40 is rigidly secured to the shaft 22 having its upper surface smooth for receiving substantially V-shaped plates 41, the points of which extend toward the shaft 22 and on the outer end there is a downwardly extending flange or apron 42 in which a set screw 43 is mounted that operates radially in the disk 40 so as to adjust said plates 41 toward the shaft 22, or outward.

There are four of the plates 41 and upon each of them there is cemented and secured a block 45 made of alundum or other suitable abrasive material, and it is substantially quadrant shaped. When they are in their innermost position, the blocks 45 engage each other at their sides so as to make what is called herein a truing wheel. When the grinding or surfacing wheel 12 is new, this truing wheel is in its compact or small-diameter form and with its outer peripheral surface given the same circumferential curvature exactly as the transverse curvature of the large grinding wheel 12. As shown herein, the transverse curvature of said grinding wheel is concave, and, therefore, the peripheral or horizontal curvature of the truing wheel is convex, as shown in Fig. 7. The truing wheel has a vertical or transverse curvature agreeing exactly with the circumferential curvature of the grinding wheel 12. When the machine is properly adjusted, the sections of the truing wheel are forced outwardly by the screws 43 until the truing wheel comes into contact with the grinding wheel 12. As the machine operates, the truing wheel slowly turns, but maintains its contact with the periphery of the grinding wheel so as to keep it in true form, as it operates. When the sections 45 of the truing wheel are adjusted, they are clamped in position by a clamp 47 which screws on the shaft 22, down against the truing wheel.

As the truing wheel wears, the truing wheel is expanded by the screws 43 and the sections thereof adjusted again and again so as to keep them operating in touch with the periphery of the grinding wheel and it is continuous until the truing wheel is worn to such an extent as to be abandoned. As the grinding wheel wears away, at times the whole means for mounting the truing mechanism can be adjusted toward the grinding wheel 12 by adjusting the plate 20 inwardly toward said wheel through the means of an adjusting screw 48. This adjusting continues until the grinding wheel is worn away sufficient to be abandoned.

The means for carrying the lens blanks and holding them to the grinding wheel 12 is shown at the left-hand end of Fig. 1. There a plate 50 is adjustably mounted on the table 11 and moved inward and outward by an adjusting screw 51, as the mechanism needs to be adjusted. Upon the plate 50, as seen in Figs. 3 and 5, there is a yoke frame 52 fulcrumed at its lower ends in bearings 54 on the plate 50 so that said frame can be rocked toward and away from the grinding wheel 12. This frame carries the spotting wheel 55, as seen in Fig. 1, upon the periphery of which the lens blanks are secured, which are to be ground or surfaced, in close succession, there being a number of blanks placed close together thereon.

The particular manner and means for mounting said spotting wheel 55 is seen in Fig. 5. In the right-hand side of the frame 52 there is a shaft 60 mounted horizontally and driven by a gear 61 secured thereon, which meshes with a pinion 62 mounted on a stub shaft 63 that carries a pulley 64 which is driven by a chain 65 running from a sprocket 66 secured on a shaft 67 which has a worm wheel 68 driven by a worm screw 69 on a shaft 70, which is driven by a worm wheel 71 driven by a worm screw on the shaft 31. The chain 65 is held taut by a wheel 73 mounted on a bar 74 suspended from the shaft 63.

The inner end of the shaft 60, as shown in Fig. 5, is turned to provide a cylindrical seat 80 for the wheel 55, there being a shoulder 81 to one side of said seat 80. The seat 80 is tubular and internally threaded to receive the threaded end of the shaft 82 which has a disk 83 thereon of larger diameter to correspond with the shoulder 81 and between which the wheel 55 is clamped. The outer end of the shaft 81 is squared for receiving a wrench and turning it and screwing it up tightly in place. The shaft 82 operates in a slidable sleeve bearing 84 on the left-hand side of the rocking frame 52 and after the wheel 55 is clamped in the manner stated, the sleeve 84 is clamped tightly in place by a cap screw 85 extending through two ears 86 on a split bearing 87 on the left-hand end of the frame 52, as seen in Fig. 4. When the part 87 is clamped by the screw 85, the disk 83 would be kept tightly against the hub of the wheel 55 and sleeve 84 would afford a secure bearing for the spotting wheel.

The blanks or work to be ground or surfaced are held against the grinding or surfacing wheel 12 yieldingly by a suitable means, such as a spring 75, which is connected with the upper end of the frame 52 and with a post 76 on the bearing block 14. The frame 52 can be rocked away from the wheel 12 by hand for examining the lens blanks thereon or for any other purpose, and its movement toward the grinding wheel 12 is adjustably limited by a stop 77 which is a set screw through an arm 78 which extends rearwardly from the frame 52, and the lower end of the set screw engages the plate 50.

While there is herein shown a rotary spotting wheel 55 for carrying the lens blanks, still this invention is not limited to such form of lens holder, as any other means for holding the lens can be used which is arranged so as to present all the portions of the surface of the lens blanks successively to the surfacing wheel, whereby the surfacing thereof will be uniform and equal.

The invention claimed is:

1. Means for rotating a lens surfacing wheel formed of a suitable abrasive, an expansible truing wheel rotatably mounted so as to engage and treat the peripheral surface of the surfacing wheel transversely thereof, and means for simultaneously driving said truing wheel and the means for rotating the surfacing wheel.

2. Means for rotating a lens surfacing wheel formed of a suitable abrasive, a truing wheel formed of sections movable with relation to each other so that the diameter of the truing wheel may be expanded or contracted, means for mounting said truing wheel so that it will engage the peripheral surface of the surfacing wheel transversely, and means for driving said truing wheel and the means for rotating the lens surfacing wheel simultaneously.

3. Means for rotating a lens surfacing wheel formed of a suitable abrasive, a truing wheel formed of sections movable with relation to each other so that the diameter of the truing wheel may be expanded or contracted, means for mounting said truing wheel so that it will engage the peripheral surface of the surfacing wheel transversely, said truing wheel having a transverse curvature substantially the same as the peripheral curvature of the surfacing wheel, and said truing wheel having a circumferential curvature substantially the same as the transverse curvature of the peripheral surface of the surfacing wheel, and means for rotating said truing wheel.

4. A frame, means on said frame for rotating a lens surfacing wheel, a vertical shaft carried by said frame near the surfacing wheel and at a right angle to the axis thereof, a truing wheel mounted on said shaft so its periphery will engage the periphery of the surfacing wheel transversely thereof, and means for driving said means for rotating the surfacing wheel and shaft simultaneously.

5. Means for rotating a lens surfacing wheel and rotatably mounted on said frame, a vertical shaft carried by said frame near the surfacing wheel and at a right angle to the axis thereof, a disk secured on said shaft, a plurality of plates slidable radially thereon, screws for adjusting said plates toward or away from said shaft, a truing wheel composed of sections, each section thereof being screwed on one of said adjustable plates, a disk adapted to screw on said shaft for clamping the sections of the truing wheel in adjusted position, the parts being so mounted that the periphery of the truing wheel will engage the periphery of the surfacing wheel tangentially thereof, and means for driving said shaft.

6. Means for rotating a lens surfacing wheel, a plate mounted slidable toward and away from the surfacing wheel, a vertical shaft mounted in said adjustable plate at a right angle to the axis of the surfacing wheel, a truing wheel mounted on said shaft and formed of sections adapted to be adjusted toward or away from said shaft so as to expand or contract said wheel and so that the periphery of the truing wheel will engage the periphery of the surfacing wheel transversely thereof, and means for driving simultaneously said means for rotating the surfacing wheel and said shaft.

In witness whereof, I have hereunto affixed my signature.

LUCIAN W. BUGBEE.